US007775764B2

(12) United States Patent
Snowsill et al.

(10) Patent No.: US 7,775,764 B2
(45) Date of Patent: Aug. 17, 2010

(54) GAS TURBINE ENGINE ROTOR VENTILATION ARRANGEMENT

(75) Inventors: Guy D Snowsill, Derby (GB); Timothy J Scanlon, Derby (GB); Colin Young, Derby (GB); Leo V Lewis, Kenilworth (GB)

(73) Assignee: Rolls-Royce plc, London (GB)

( * ) Notice: Subject to any disclaimer, the term of this patent is extended or adjusted under 35 U.S.C. 154(b) by 649 days.

(21) Appl. No.: 11/702,589

(22) Filed: Feb. 6, 2007

(65) Prior Publication Data

US 2007/0189890 A1 Aug. 16, 2007

(30) Foreign Application Priority Data

Feb. 15, 2006 (GB) ................................ 0603030.8

(51) Int. Cl.
*F02C 7/18* (2006.01)
*F01D 5/08* (2006.01)

(52) U.S. Cl. .................................... 415/115; 415/199.5

(58) Field of Classification Search ................. 415/115, 415/199.5; 416/95, 96 R, 97 R See application file for complete search history.

(56) References Cited

U.S. PATENT DOCUMENTS

| | | | | |
|---|---|---|---|---|
| 2,858,101 A * | 10/1958 | Alford | 416/97 R |
| 2,973,938 A * | 3/1961 | Alford | 416/96 R |
| 3,043,561 A * | 7/1962 | Scheper, Jr. | 415/115 |
| 3,647,313 A * | 3/1972 | Koff | 415/115 |
| 4,648,791 A * | 3/1987 | Kreitmeier | 415/116 |
| 5,134,844 A * | 8/1992 | Lee et al. | 60/806 |
| 5,660,526 A * | 8/1997 | Ress, Jr. | 416/198 A |
| 5,755,556 A | 5/1998 | Hultgren | |
| 6,094,905 A * | 8/2000 | Fukuyama | 60/806 |
| 2003/0133786 A1 | 7/2003 | Uematsu | |
| 2004/0148943 A1 | 8/2004 | Laurello | |

FOREIGN PATENT DOCUMENTS

| | | |
|---|---|---|
| EP | 0 864 728 A | 5/2000 |
| EP | 1 091 089 A | 12/2003 |
| EP | 1 211 386 A | 1/2004 |

* cited by examiner

*Primary Examiner*—Edward Look
*Assistant Examiner*—Jesse Prager
(74) *Attorney, Agent, or Firm*—Jeffrey S. Melcher; Manelli Denison & Selter PLLC

(57) ABSTRACT

A rotor assembly for a gas turbine engine, the rotor assembly comprises at least two rotors defining a cavity therebetween. A first rotor defines a cooling air inlet in its radially inward portion. A second rotor defines a cooling air outlet in its radially outward portion, such that the cooling air passes radially outwardly through the cavity.

17 Claims, 5 Drawing Sheets

74
76
25
X
X
35
39
67
72
65
34
38
70
33
C
E
70
66
37
32
65
36
72
70
31
64
56
58
50
A
E

GAS TURBINE ENGINE ROTOR VENTILATION ARRANGEMENT

FIELD OF THE INVENTION

This invention relates to ventilation of rotor assemblies in gas turbine engines, and in particular to cooling flow paths in such rotor assemblies.

BACKGROUND OF THE INVENTION

It is known to ventilate a rotating cavity by supplying an axial through-flow of air, which is cooler than the disc drums of turbines or compressors. This axial through-flow of air is inherently unstable and complex flow patterns are set up in the cavities that make heat transfer effects very difficult to quantify and reduces cooling efficiency. To partially remedy this problem, it is also known to introduce a radially inward through-flow into the cavity, and subsequently heat transfer in the cavity is both enhanced and made more predictable, but is still not sufficiently accurate.

Where accurate prediction and maximised cooling is available it is possible, in the case of a compressor rotor, to improve component lives, enable the use of cheaper materials, have a better control of blade tip clearances and hence improve thermodynamic efficiency and operability.

Therefore, the object of the present invention is to provide an improved cooling arrangement for the cavities between rotors in turbine and compressor assemblies of gas turbine engines.

SUMMARY OF THE INVENTION

According to the invention, there is provided a rotor assembly for a gas turbine engine, the rotor assembly comprises at least two rotors defining a cavity therebetween; a first rotor defines a cooling air inlet in its radially inward portion, characterized in that a second rotor defines a cooling air outlet in its radially outward portion, such that the cooling air passes radially outwardly through the cavity.

Preferably, the rotor assembly comprises a third rotor stage defining a second cavity with the second stage, the cooling air that passes through the outlet then passes into and radially inwardly through the second cavity to pass through the bore of the third rotor.

Preferably, the rotor assembly comprises a fourth rotor defining a third cavity with the third stage, the cooling air that passes through the bore of the third stage then passes into and radially outwardly through the third cavity to pass through a cooling air outlet defined in a radially outward portion of the fourth stage.

Preferably, the rotor assembly comprises a fifth rotor defining a fourth cavity with the first rotor, at least one inlet is defined in a shroud of the first or fifth rotors, the cooling enters the fourth cavity via the inlet and passes radially inwardly through the fourth cavity and into the first cavity via the bore of the first rotor.

Preferably, the fifth rotor defines a bore and the cooling entering the fourth cavity passes through the bore of the fifth rotor.

Additionally, the rotor assembly comprises a sixth rotor defining a fifth cavity with the fifth rotor, at least one outlet is defined in the radially outer part of the sixth rotor, the cooling air entering the fifth cavity passes radially outwardly between the bore of the fifth rotor and the outlet.

Preferably, the cooling air passes in a generally rearward direction through the rotor assembly.

Alternatively, the cooling air passes in a generally forward direction through the rotor assembly.

Alternatively, the cooling air passing the first, second, third and fourth rotors passes in a rearward direction and the cooling air passing the fifth and sixth rotors passes in a forward direction.

Although at least one of the cooling air outlets is angled in the axial direction, preferably, the cooling air outlet is angled tangentially also such that the cooling air has a component of velocity in the tangential direction and further in the direction of rotation of the disc.

Alternatively, the cooling air outlet is angled tangentially in the opposite direction of rotation of the disc.

It is also possible that at least one of the cooling air outlets is angled radially such that the cooling air has a component of velocity in the radial direction being angled radially inwardly or radially outwardly.

Preferably, the cooling air inlet is a bore of the first rotor.

Preferably, a shaft passes through the bore of at least some of the rotor stages of the rotor assembly.

Preferably, a seal is provided between the shaft and any one or more of the group comprising the second, the fourth and the sixth rotors.

Preferably, the seal is a labyrinth seal.

Alternatively, the seal comprises a small clearance between the bore of the rotor and the shaft such that the airflow into the respective cavity preferentially passes through the cooling air outlet.

Preferably, the assembly is a compressor assembly.

Alternatively, the assembly is a turbine assembly.

Preferably, a gas turbine engine comprises a rotor assembly as claimed in any one of the preceding paragraphs.

BRIEF DESCRIPTION OF THE DRAWINGS

Embodiments of the invention will now be described by way of example only, with reference to the accompanying diagrammatic drawings, in which:—

DETAILED DESCRIPTION OF THE INVENTION

Figure 1:
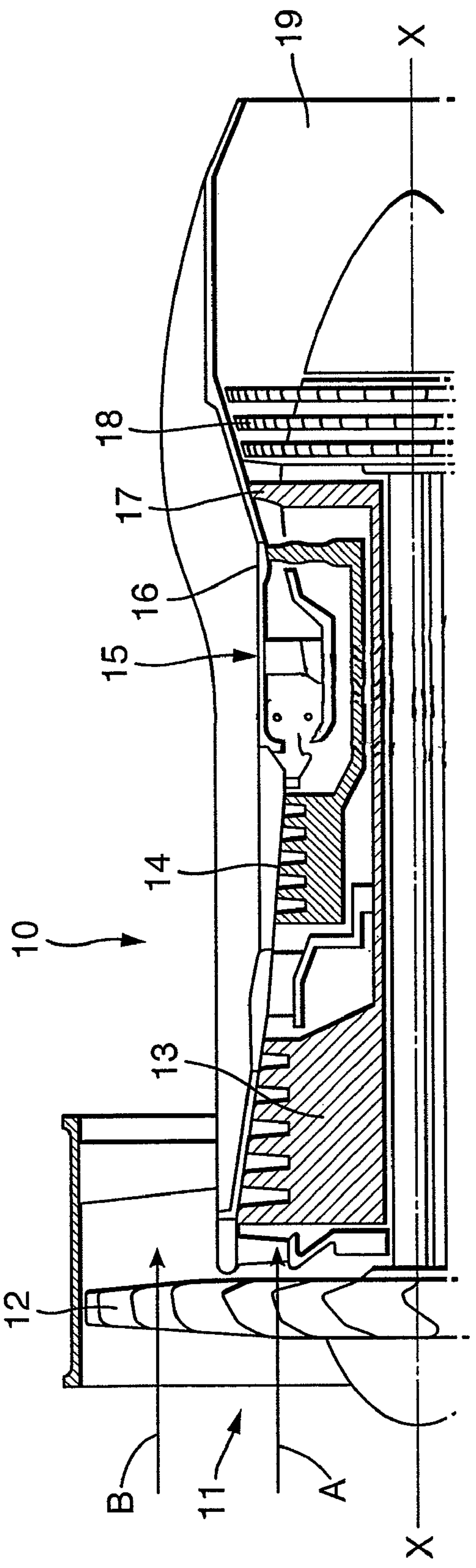
FIG. 1 is a sectional side view of a gas turbine engine.

With reference to FIG. 1, a gas turbine engine is generally indicated at 10 and comprises, in axial flow (arrow A) series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in the conventional manner so that air entering the intake 11 is accelerated by the fan to produce two air flows: a first air flow A into the intermediate pressure compressor 13 and a second air flow B which provides propulsive thrust. The intermediate pressure compressor 13 compresses the airflow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive, the high, intermediate and low-pressure turbines 16, 17 and 18 before being exhausted through the nozzle 19 to provide additional propulsive thrust. The high, intermediate and low-pressure turbines 16, 17 and 18 respectively drive the high and intermediate pressure compressors 14 and 13 and the fan 12 by suitable interconnecting shafts.

The terms forward and rearward are used with reference to the engine 10, the fan 12 being at the forward part of the engine 10 and a rearward flow of air or cooling fluid is in the general direction indicated by airflow arrow A.

FIGS. 2-5 show the intermediate compressor 13 in more detail; the compressor 13 comprises a series of rotating discs or rotors 31, 32, 33, 34, 35 in downstream or rearward sequence relative to the main airflow A through the engine 10. The discs 31-35 define cavities 36-39 therebetween respectively. Each rotating disc 31-35 carries an annular array of radially extending compressor blades 40-44 respectively at their outer shrouds 52, which are interposed with cooperating stator vanes 45-49. The compressor 13 works in conventional manner with each successive rotor stage further compressing the main airflow A. The compressor 13 is driven by the intermediate turbine 17 via interconnecting shaft 25, which rotates about a main engine axis X-X.

Figure 2:
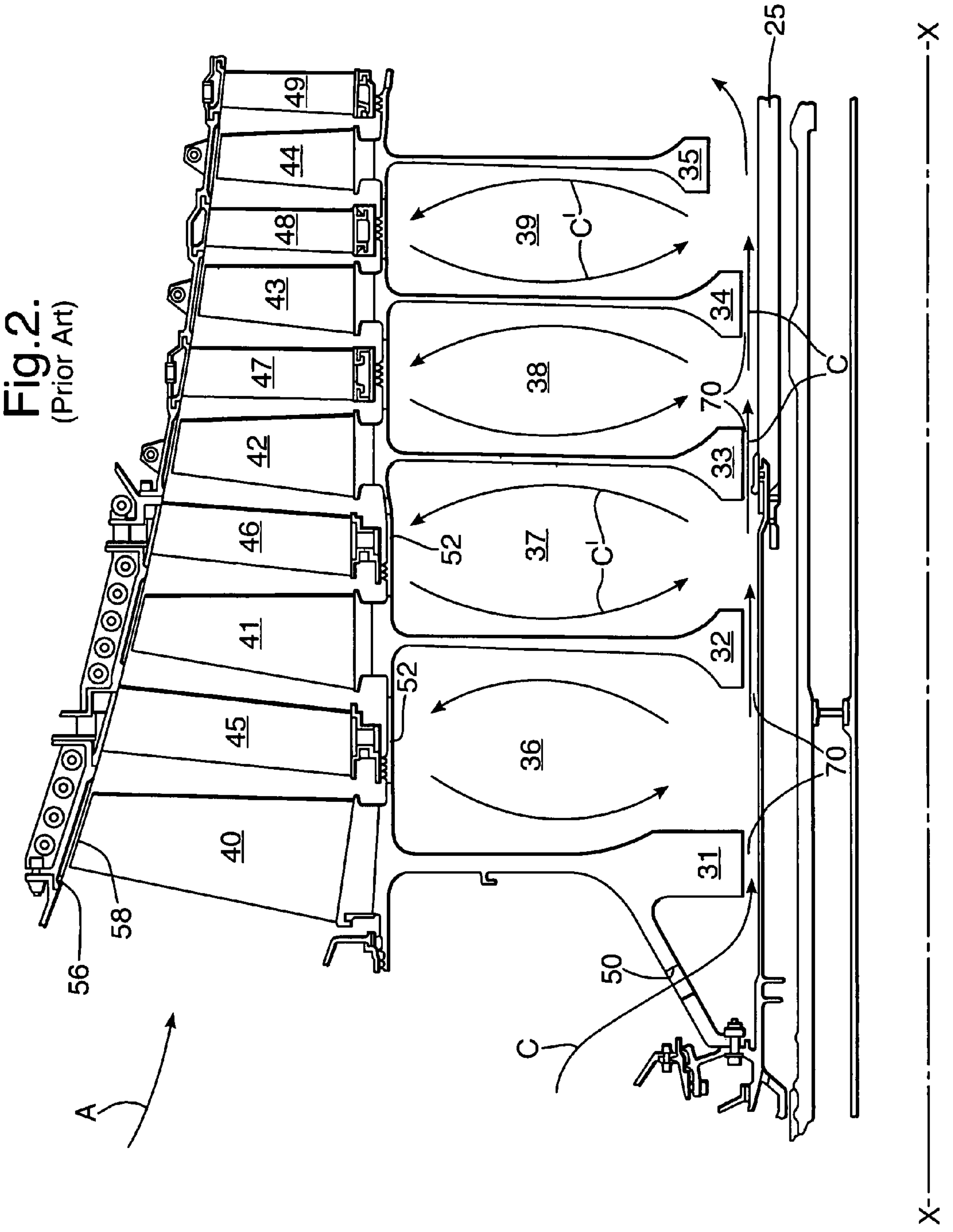
Fig.2. (Prior Art)
FIG. 2 is a sectional side view of part of a prior art compressor of the engine shown in FIG. 1.

Prior art FIG. 2 shows a ventilating or cooling airflow C entering the compressor 13 through one of a series of ventilation holes 50 defined within the upstream disc 31. The airflow C passes through the compressor 13 between the discs' bores 70 and the shaft 25. As the airflow C passes generally axially through the compressor 13, a portion of the flow C' circulates within each cavity 36-39 successively.

Penetration of ventilation airflow C into the cavities 36-39 relies on momentum exchange between the through-flowing air C and the air in each cavity. In the important case where the rotor discs 31-35 and particularly their shrouds 52 are hotter than the ventilation airflow C', the flow in the cavities is further complicated by buoyancy effects of different regions of airflows being of different temperatures.

Figure 3:
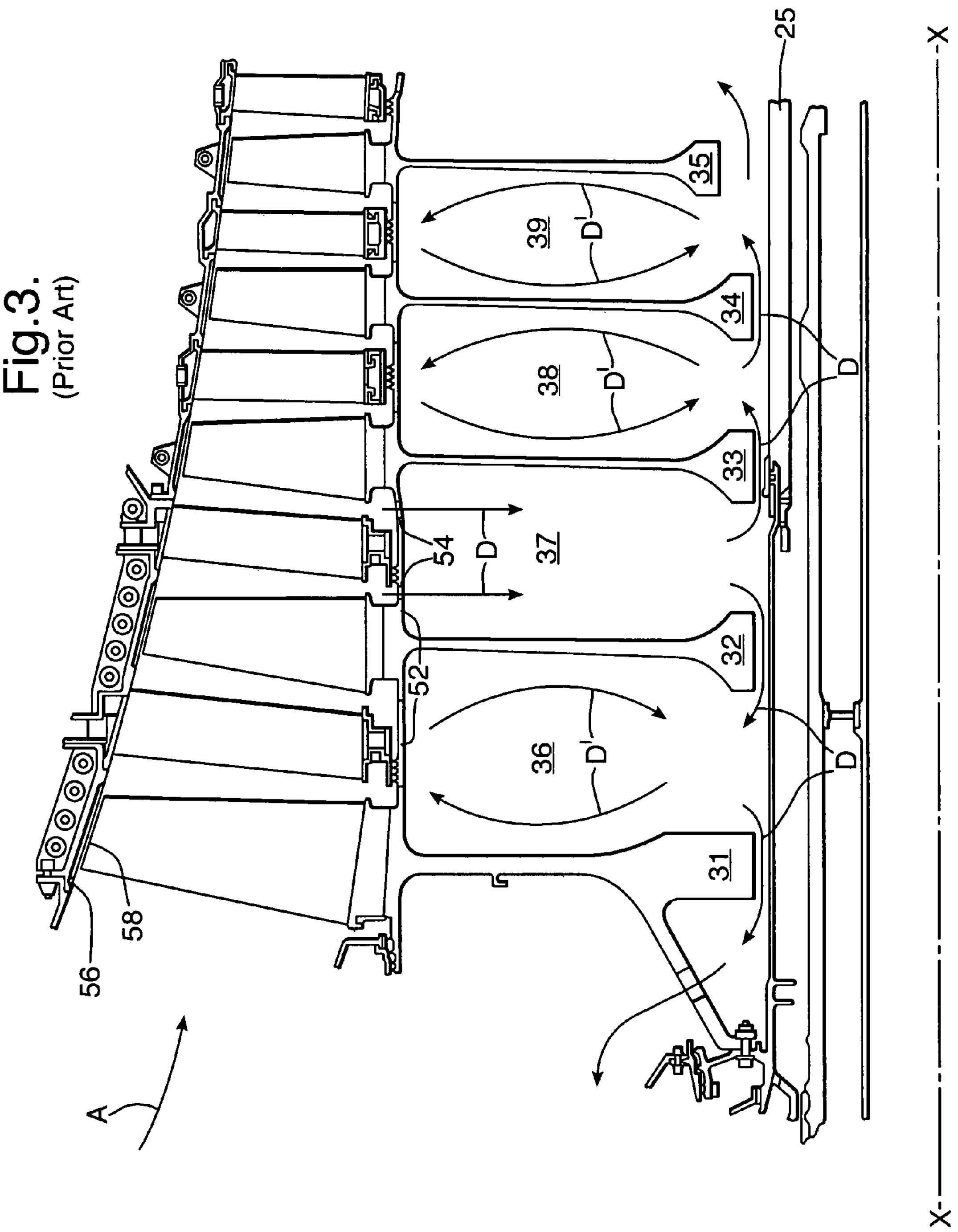
Fig.3. (Prior Art)
FIG. 3 is a sectional side view of part of a second prior art compressor of the engine shown in FIG. 1.

Referring now to FIG. 3, where the same reference numerals indicate the same components shown in FIG. 2, a second prior art ventilation arrangement comprises one of the shrouds 52 defining an annular array of cooling air inlet holes 54. Cooling airflow D enters cavity 37 flowing radially inwardly towards the engine centre line X-X and then flows upstream and downstream (relative to main gas flow A) through the compressor 13 between the discs' bores 70 and the shaft 25. As the airflow D passes through the compressor 13, a portion of the flow D' circulates within each cavity 36 and 38, 39 successively. This radial flow confers an improvement over the previous prior art arrangement for the thermal response of the discs 32, 33 (only). However, this arrangement of supplying cooling air cannot usefully be applied to the other cavities (36, 38, 39) to provide sufficient ventilation for each cavity because, a) the total air consumption would be excessive, and b) the air available at the rear of the compressor would be too hot to be useful in ventilating the cavities 38 and 39.

Further disadvantages are apparent in the prior art cooling airflow systems. Particularly, the process of momentum exchange induced, between the through-flowing airflow principally along the shaft 25, is weak and difficult to predict. This momentum exchange and mixing of the flow is difficult to analyse and is relatively ineffective in promoting heat transfer from disc to airflow. In these prior art examples, the cavity walls are hotter than the airflow and therefore the nature of the flow in the cavity is further complicated by buoyancy effects between hotter air and cooler air regions in each cavity. Other physical features which may be introduced to help mix the airflows and control the level of ventilation and to optimise the thermal response of the rotor usually compromise disc weight, which is highly disadvantageous for such a critical engine component.

Thus it should be appreciated that these problems also limit material choices for the discs and other engine architecture and, in the specific case of a compressor or turbine rotor, impacts blade tip clearances which has a direct impact on engine efficiency. "Tip clearance" refers to the gap between a blade tip 58 and a (compressor) casing 56. Tip clearances are affected by thermal expansions and contractions within the rotor assemblies (e.g. 32 and 40) as well as rotational centrifugal forces. Thus, achieving greater control and prediction of the thermal characteristics of any compressor or turbine rotor stage, better control of and reduction of the tip clearances will be possible.

The object of the present invention is therefore to provide a ventilation/cooling arrangement that is more predictable and efficient at removing heat from the discs/rotor assemblies of compressors and turbines.

Figure 4:
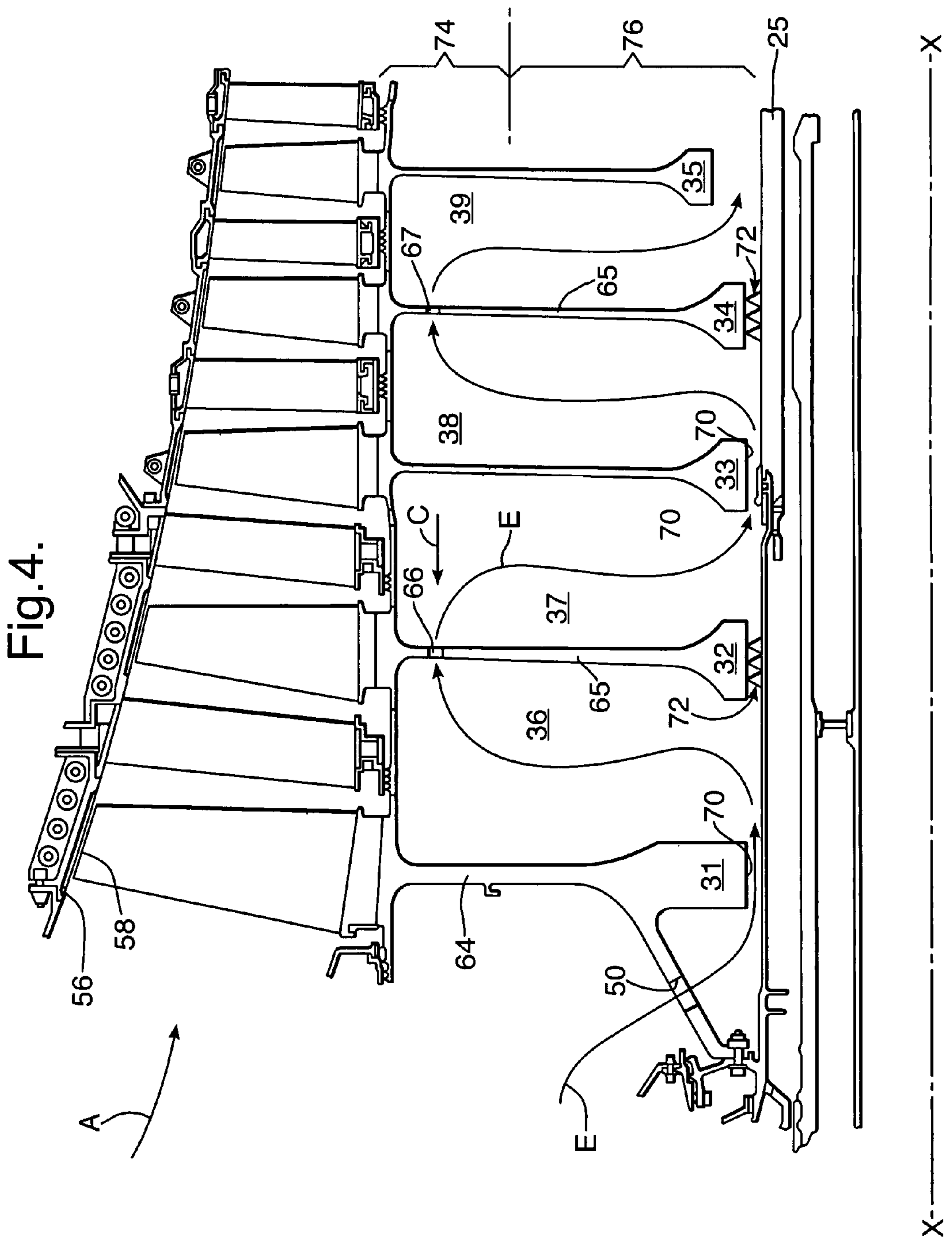
FIG. 4 is a sectional side view of part of a first embodiment of a ventilation arrangement of the compressor of the engine shown in FIG. 1 in accordance with the present invention.

Referring now to FIG. 4, which substantially comprises the same components and reference numerals as in FIGS. 1, 2 and 3, annular arrays of holes 66, 67 are introduced in a radially outer part 74 of alternate discs 32, 34 diaphragms 65. Seals 72 are placed between the bores of these discs 32, 34 and the shaft 25. Thus an airflow E entering through the array of ventilation/cooling holes 50 flows through disc bore 31 into and radially through cavity 36, passes through hole 66 in diaphragm 65, radially inwardly to pass through disc bore 70 and so on through cavity 38, holes 67 and cavity 39 in a substantially serpentine flow pattern.

Each rotor disc 31-35 and 81-85 (FIGS. 4 and 5) comprises a radially outer part 74 and a radially inner part 76. As the present invention relates to achieving at least a part radial through-flow of cooling air, the inner and outer parts of the rotors merely indicate that cooling air inlets and outlets are radially spaced relative to one another. It is preferable that the inlets and outlets are positioned as radially far apart as practical. The airflow passing through the bores 70 of disc 31 and 33, may alternatively flow through other holes in a radially inner part 76 of the discs.

More specifically, the present invention relates to a rotor assembly comprising at least two rotors 31, 32 which define a cavity 36. The first rotor 31 defines a cooling air inlet 70 in its radially inward portion 76 and the second rotor 32 defines a cooling air outlet 66 in its radially outward portion 74, such that the cooling air passes radially outwardly through the cavity 36. The rotor assembly further comprises the third rotor stage 33 defining a second cavity 37 with the second stage 32, the cooling air that passes through the outlet 66 then passes into and radially inwardly through the second cavity 37 to pass through the bore 70 of the third rotor 33.

Still further, the rotor assembly comprises a fourth rotor 34 defining the third cavity 38 with the third stage 33. The cooling air that passes through the bore 70 of the third stage 33 then passes into and radially outwardly through the third cavity 38 to pass through a cooling air outlet 67 defined in a radially outward portion 74 of the fourth stage 34.

It should be appreciated that further rotor stages may be included in a typical compressor or turbine arrangement in a gas turbine engine.

Figure 5:
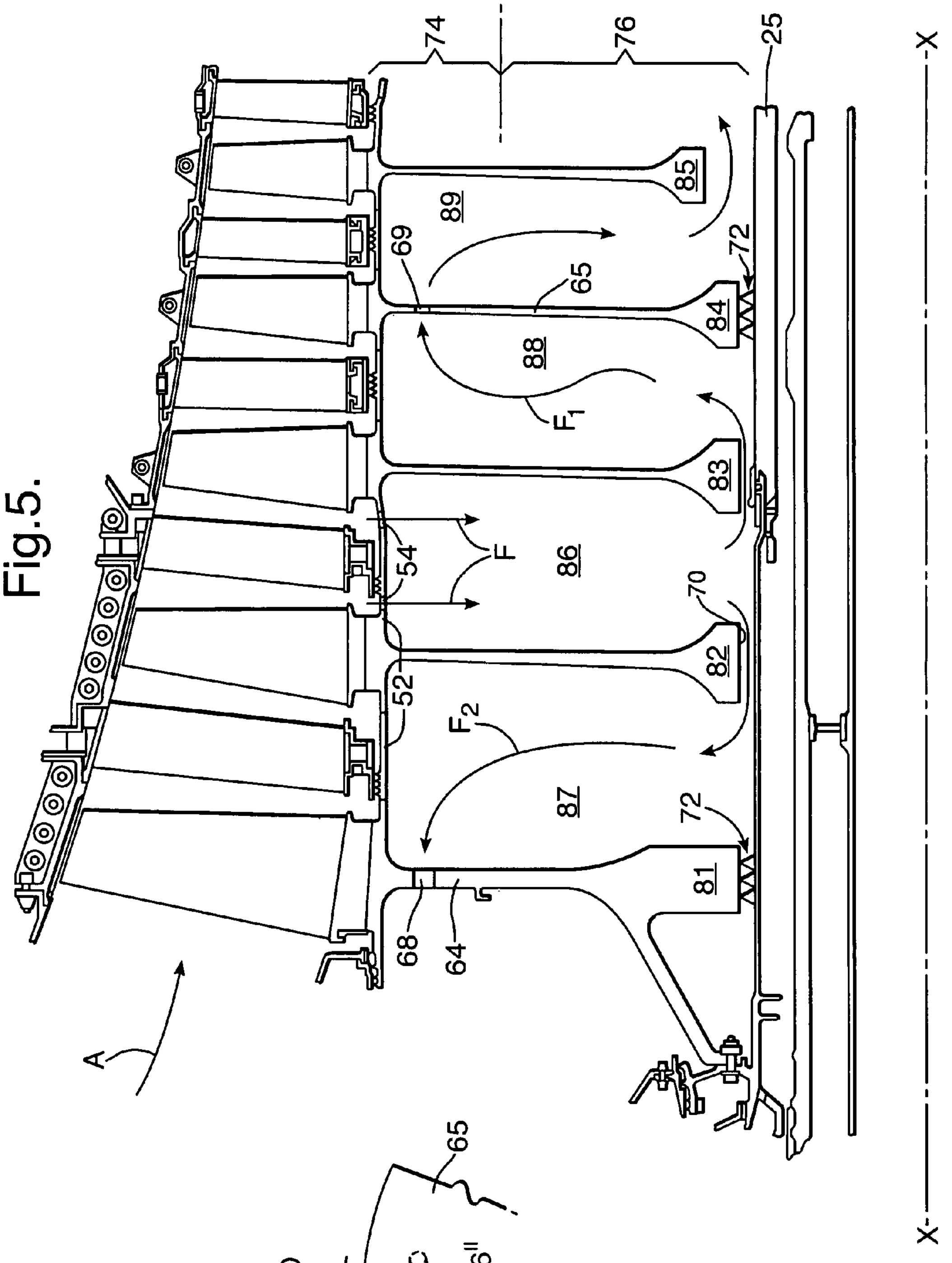
FIG. 5 is a sectional side view of part of a second embodiment of a ventilation arrangement of the compressor of the engine shown in FIG. 1 in accordance with the present invention.

Referring now to FIG. 5, this alternative embodiment differs in that cooling air is bled from a mid-stage of the compressor 13. Here an array of inlet holes 54 is provided in the shroud 52 of the discs 82, 83 and are similar to 32, 33 described with reference to FIG. 3. A cooling airflow F passes through the inlet holes 54 into and radially inwardly towards the shaft 25. The airflow F splits into two airflows, $F_1$ and $F_2$, in which airflow $F_1$ passes rearwards through the bore of rotor 83, similarly to the bore of rotor 31 in FIG. 4, and flows radially outwardly through cavity 88 and through respective arrays of holes 69 in the radially outer parts of disc diaphragms 64, 65. Essentially, this embodiment is equivalent to the FIG. 4 embodiment from the 'first' rotor 83/31 rearward and may comprise more rotor stages than is shown.

The rotor assembly of FIG. 5 also comprises a fourth rotor 82, positioned forward of the first rotor 83. The fourth rotor defines a fourth cavity 86 with the first rotor 83 and the array of inlet holes 54 is defined in the shrouds 52 of the first and/or fourth rotors 83, 82. The cooling airflow F splits into the rearward airflow $F_1$ and forward airflow $F_2$, $F_2$ entering the fourth cavity 86 via the inlet 54 and passes radially inwardly through the fourth cavity 86 and into the third cavity 87 via the bore 70 of the fourth rotor 82. The fourth rotor 82 defines a bore 70 and the cooling entering the fourth cavity 86 also passes through the bore 70 of the fourth rotor 82.

The rotor assembly may further comprise a fifth rotor 81 defining a third cavity 87 with the fourth rotor 82. An array of outlets 68 is defined in the radially outer part 74 of the fifth rotor 81, the cooling air entering the third cavity 87 passes radially outwardly between the bore 70 of the fourth rotor 82 and the outlet 68.

These two arrangements of the present invention are advantageous in that heat transfer will be significantly enhanced because the coolant flows in one direction through each cavity. Therefore, heat transfer coefficients can be calculated with greater confidence for use in mathematical models for calculating thermal characteristics of the compressor or turbine. Furthermore, the amount of cooling through-flow can be metered by suitable sizing of the inlet and outlet holes in the shrouds and diaphragms enabling the thermal response of the rotor assembly to be optimized and reduce tip clearances, particularly at transient engine conditions, e.g. between say take-off and cruise operating engine speeds, but also at steady state engine running. Reducing tip clearances reduces the amount of over-tip leakage thereby improving engine efficiency.

By using a flow from one source (through holes 50 or 54) to successively ventilate cavities: the optimum source of cooling air can be utilised (normally but not necessarily the coolest), the total air consumption is minimised. Still further by allowing better control of tip clearances, significant improvement in compressor efficiency can be realised A further advantage of the present invention is the improvement of the thermal response of rotor discs thereby increasing the life of the rotor components. Alternatively, the use of less capable and cheaper materials may be possible.

Note that, although labyrinth seals are implied in the sketch, any form of seal would have the effect claimed, including simply arranging for a minimised clearance between the disc bore and the shaft.

It should be appreciated that although the exemplary embodiment is described with reference to the compressor 13, the present invention is applicable to any compressor or any turbine in a gas or steam turbine engine whether for aero, industrial or marine application.

Figure 6:
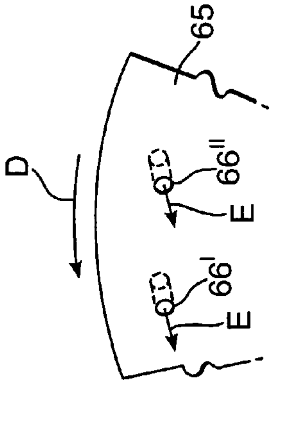
FIG. 6 is a view (arrow C in FIG. 4) on a part of a rotor disc of the present invention.

In FIG. 6, the outlet 66' through which cooling air flow E passes into the second cavity 37 is formed at an angle such that the air is given a tangential component of velocity. In particular, the outlet 66' is angled forwardly such that the air flow E is in the direction of rotation of the disc 65. This tangential angling of the outlet 66' increases the relative velocity between the disc 65 and the cooling air E in the cavity 37, thereby improving heat removal from the disc 65. It will be appreciated that outlets may be angled in the opposite direction to rotation of the disc 65 to increase the relative velocity between cooling air and disc where such a regime exists. Furthermore, outlet 66" may be angled radially such that the cooling airflow has a radial component of velocity, helping direct the cooling air in the direction of the through-flow. In this case the outlet 66" is angled both radially inwardly and tangentially.

We claim:

1. A rotor assembly for a gas turbine engine, the rotor assembly comprising:

first and second rotors defining a first cavity therebetween, wherein each rotor comprises a disc carrying an annular array of radially extending blades;

the first rotor defining a cooling air inlet in a radially inward portion of the first rotor;

the second rotor defining a cooling air outlet in a radially outward portion of the second rotor, such that cooling air passes radially outwardly through said first cavity during operation of the engine;

a third rotor having a bore and defining a second cavity with said second rotor, wherein during operation of the engine said cooling air passes through said outlet then passing into and radially inwardly through said second cavity to pass through said bore; and a fourth rotor defining a third cavity with the third rotor, during operation of the engine the cooling air that passes through the bore of the third rotor then passes into and radially outwardly through the third cavity to pass through a second cooling air outlet defined in a radially outward portion of the fourth rotor, the fourth rotor having a second bore sealed by a seal so that cooling air cannot flow through the second bore, wherein the seal comprises a small clearance between the bore of the rotor and a shaft such that the airflow into the respective cavity preferentially passes through the cooling air outlet.

2. A rotor assembly for a gas turbine engine, said rotor assembly comprising:

first and second rotors defining a first cavity therebetween, the first rotor having a first bore and the second rotor having a second bore, wherein each rotor comprises a disc carrying an annular array of radially extending blades;

a shroud having a cooling air inlet for flowing cooling air into the first cavity during operation of the engine so that the cooling air flows radially inward through the first cavity and flows through the first and second bores;

a third rotor defining a second cavity with the second rotor, the third rotor having a first air outlet at a radially outward portion of the third rotor, and the third rotor having a third bore that is sealed with a seal to prevent cooling air from flowing through the third bore, such that during operation of the engine cooling air flows from the second bore into the second cavity and flows in a radially outward direction through the second cavity and into the first air outlet; and a fourth rotor defining a third cavity with the first rotor, the fourth rotor having a second air outlet at a radially outward portion of the fourth rotor, and the fourth rotor having a fourth bore that is sealed with a seal to prevent cooling air from flowing through the fourth bore, such that during operation of the engine cooling air flows from the first bore into the third cavity and flows in a radially outward direction through the third cavity and into the second air outlet, wherein the seal comprises a small clearance between the bore of the rotor and a shaft such that the airflow into the respective cavity preferentially passes through the cooling air outlet.

3. A rotor assembly as claimed in claim 1, wherein the cooling air passes in a generally rearward direction through the rotor assembly during operation of the engine.

4. A rotor assembly as claimed in claim 2, wherein during operation of the engine the cooling air traveling from the first cavity to the second cavity travels in a rearward direction and the cooling air traveling from the first cavity to the third cavity travels in a forward direction.

5. A rotor assembly as claimed in claim 1, wherein said cooling air outlet is angled in the axial direction.

6. A rotor assembly as claimed in claim 1, wherein the cooling air outlet is angled tangentially such that the cooling air has a component of velocity in the tangential direction.

7. A rotor assembly as claimed in claim 6, wherein the cooling air outlet is angled tangentially in the direction of rotation of the disc.

8. A rotor assembly as claimed in claim 6, wherein the cooling air outlet is angled tangentially in the opposite direction of rotation of the disc.

9. A rotor assembly as claimed in claim 1, wherein the cooling air outlet is angled radially such that the cooling air has a component of velocity in the radial direction.

10. A rotor assembly as claimed in claim 9, wherein the cooling air outlet is angled radially inwardly or radially outwardly.

11. A rotor assembly as claimed in claim 1, wherein the cooling air inlet is a bore of the first rotor.

12. A rotor assembly as claimed in claim 1, wherein a shaft passes through the bore of at least some of the rotors of the rotor assembly.

13. A rotor assembly as claimed in claim 1, wherein the seal is a labyrinth seal.

14. A rotor assembly as claimed in claim 1 wherein the assembly is a compressor assembly.

15. A rotor assembly as claimed in claim 1 wherein the assembly is a turbine assembly.

16. A gas turbine engine comprising a rotor assembly as claimed in claim 1.

17. A rotor assembly according to claim 2, wherein the seal is a labyrinth seal.

* * * * *